(12) United States Patent
Cho et al.

(10) Patent No.: US 9,017,555 B2
(45) Date of Patent: Apr. 28, 2015

(54) DEVICE FOR TREATMENT OF WASTE LIQUID

(75) Inventors: Hang Rae Cho, Daejeon (KR); Ho Yeon Yang, Daejeon (KR); Ji Hoon Lee, Daejeon (KR); Tae Won Hwang, Daejeon (KR); Young Bu Choi, Daejeon (KR)

(73) Assignee: Korea Hydro & Nuclear Power Co., Ltd. (KR)

( * ) Notice: Subject to any disclaimer, the term of this patent is extended or adjusted under 35 U.S.C. 154(b) by 880 days.

(21) Appl. No.: 13/184,599

(22) Filed: Jul. 18, 2011

(65) Prior Publication Data

US 2013/0020245 A1 Jan. 24, 2013

(51) Int. Cl.
*B01D 63/16* (2006.01)
*B01D 61/18* (2006.01)
*B01D 65/08* (2006.01)

(52) U.S. Cl.
CPC .............. *B01D 61/18* (2013.01); *B01D 65/08* (2013.01); *B01D 2315/06* (2013.01); *B01D 2321/185* (2013.01)

(58) Field of Classification Search
CPC ........... B01D 2315/02; B01D 2315/04; B01D 2315/06; B01D 2321/30; B01D 2319/04; B01D 2321/18; B01D 2321/185; B01D 65/02; B01D 65/04; B01D 65/08; B01D 23/0003; B01D 23/0006; B01D 23/0009; B01D 23/34; B01D 23/56; B01D 25/34; B01D 2201/087; B01D 2201/36; B01D 29/0084; B01D 29/0088; B01D 29/6415; B01D 29/66; B01D 29/661; B01D 29/74; B01D 33/0003; B01D 33/0006; B01D 33/0009; B01D 33/56; B01D 33/34; B01D 2313/26; C02F 3/06; C02F 3/08; C02F 3/082; C02F 3/1268; C02F 3/1273; C02F 3/205

USPC ........... 210/231.67, 321.68, 172.2, 210, 216, 210/297, 324, 330, 359, 405, 232, 332, 251
See application file for complete search history.

(56) References Cited

U.S. PATENT DOCUMENTS 4,224,160 A * 9/1980 Wendland ...................... 210/236
4,333,832 A * 6/1982 Siwecki et al. ............ 210/195.2
(Continued)

FOREIGN PATENT DOCUMENTS

JP 2011-005433 * 1/2011
KR P0149621 B1 6/1998

OTHER PUBLICATIONS

English language machine translation of JP2011-005433, pp. 1-14, No Date.*

*Primary Examiner* — David C Mellon
*Assistant Examiner* — Pranav Patel
(74) *Attorney, Agent, or Firm* — Leydig, Voit & Mayer, Ltd.

(57) ABSTRACT

A waste liquid treatment apparatus with enhanced treatment capacity for a pre-treatment facility of a liquid radwaste treatment system for a nuclear power plant. The waste liquid treatment apparatus includes: a water tank into which a waste liquid is introduced and from which filtered permeated water is discharged; a waste liquid introduction section through which waste liquid is introduced into the water tank; submerged membranes annularly disposed and spaced apart from each other for filtering foreign substances from the waste liquid; a permeated water suctioning section suctioning the filtered water of the waste liquid and discharging the filtered water outside the water tank; an air supplying section supplying compressed air to the submerged membranes to remove foreign substances; and a porous support plate supporting the submerged membranes.

9 Claims, 4 Drawing Sheets

(56) References Cited

U.S. PATENT DOCUMENTS

| | | | |
|---|---|---|---|
| 5,230,538 A * | 7/1993 | Kobayashi | 285/316 |
| 5,578,214 A | 11/1996 | Yamasaki et al. | |
| 2002/0139748 A1 * | 10/2002 | Cote et al. | 210/636 |
| 2007/0056893 A1 * | 3/2007 | Noh et al. | 210/321.61 |
| 2007/0221565 A1 * | 9/2007 | Benscoter | 210/416.3 |
| 2007/0251876 A1 * | 11/2007 | Krogue et al. | 210/323.2 |
| 2008/0006571 A1 * | 1/2008 | Arnaud | 210/321.64 |
| 2008/0105605 A1 * | 5/2008 | Kobayashi | 210/209 |
| 2009/0236280 A1 * | 9/2009 | Morita et al. | 210/321.69 |
| 2010/0126947 A1 * | 5/2010 | Cole | 210/791 |
| 2011/0068057 A1 * | 3/2011 | Haley et al. | 210/619 |

* cited by examiner

DEVICE FOR TREATMENT OF WASTE LIQUID

BACKGROUND OF THE INVENTION

1. Field of the Invention

The present invention relates to a waste liquid treatment apparatus, and more particularly, to a waste liquid treatment apparatus which enhances treatment capacity due to an increase in the number of submerged ultra-filtration membranes (hereinafter referred to as "submerged membranes") installed within a solid/liquid separator of a pre-treatment facility of a liquid radioactive waste treatment system for a nuclear power plant, improves convenience of exchange of the used submerged membranes, and reduces radiation exposure of an operator.

2. Description of the Related Art

Submerged membranes are applied to pretreatment equipment of liquid radioactive waste (radwaste) systems of some nuclear power plants.

Such submerged membranes are installed within solid/liquid separators to primarily process introduced radwastes.

Such a submerged membrane serves to remove turbidity-causing material, and organic and inorganic suspended solids in a radwaste liquid.

In a treatment process of a submerged membrane, permeated water is suctioned by forming a vacuum state of a certain range in a permeated pipe, aeration is continuously performed through an air diffuser below a submerged membrane to restrict a filter plugging phenomenon of the submerged membrane, and backwashing is periodically performed.

However, in the conventional waste liquid treatment apparatus, since submerged membranes are linearly disposed in a solid/liquid separator, the number of installed submerged membranes is limited.

Also, in the conventional waste liquid treatment apparatus, when used submerged membranes are exchanged, an upper cover of the solid/liquid separator is opened, and after connectors between the suction openings of the submerged membranes and air introduction openings of air diffusers are released in a state in which an operator enters a water tank and is close to the submerged membranes where radioactive particles being condensed, the used submerged membranes are removed through an upper portion of the water tank. However, in the above-mentioned method of exchanging the submerged membranes, it is not easy to exchange the submerged membranes and an operator is directly exposed to radioactive rays, causing excessive radiation exposure to the operator.

Moreover, in the conventional waste liquid treatment apparatus, submerged membranes are positioned on a fixed porous support plate and a separate fixing unit is installed to fix the submerged membranes in the solid/liquid separator. However, in this case, since the heights of the installable submerged membranes are fixed, submerged membranes of various heights cannot be installed, causing much time to be consumed in attaching and detaching the submerged membranes and making it difficult to operate the apparatus.

SUMMARY OF THE INVENTION

Accordingly, the present invention has been made to solve the above-mentioned problems occurring in the prior art, and an aspect of the present invention provides a waste liquid treatment apparatus which enhances a treatment capacity of a radioactive waste (radwaste) liquid, improves convenience of exchange of submerged membranes, and reduces radiation exposure of an operator when the submerged membranes used in radwaste liquid treatment equipment for a nuclear power plant are installed in a solid/liquid separator, and is commonly applied to treat harmful/toxic materials in addition to a radwaste liquid.

In accordance with an aspect of the present invention, there is provided a waste liquid treatment apparatus including: a water tank into which a waste liquid is introduced and from which filtered permeated water is discharged; a waste liquid introduction section through which waste liquid is introduced into the water tank; a plurality of submerged membranes annularly disposed in the water tank to be spaced apart from each other and configured to filter foreign substances contained in the waste liquid introduced through the waste liquid introduction section; a permeated water suctioning section configured to suction the permeated water of the waste liquid which has passed through the submerged membranes and supply the permeated water to the outside of the water tank; an air supplying section configured to supply compressed air to the submerged membranes to prevent foreign substances from being stuck to surfaces of the submerged membranes; and a porous support plate configured to support lower portions of the submerged membranes and having a plurality of pores on a surface thereof.

The permeated water suctioning section may include an upper permeated water line extending from the outside of the water tank to an upper side of the water tank, a permeated water suctioning line connected to the permeated water line and extending into the water tank, and a plurality of annular permeated water suctioning pipes radially extending from the permeated water suctioning line and annularly disposed above the submerged membranes, and the air supplying section includes an upper air line for supplying compressed air from the outside to an upper side of the water tank, an air supplying line connected to the upper air line and extending into the water tank while surrounding an outer peripheral surface of the permeated water suctioning line, and a plurality of annular air supplying pipes radially extending from the air supplying line and annularly disposed above the submerged membranes.

A plurality of membrane connecting sockets corresponding to the number of the annularly disposed submerged membranes and installed on bottom surfaces of the annular permeated water suctioning pipes may be connected to suction nozzles installed at upper end of the submerged membranes by means of quick couplings, and air diffusers connected to air inlet openings installed below the submerged membranes may be connected to the annular air supplying pipes by means of one-touch connectors.

The permeated water suctioning line and the porous support plate may be connected to each other by means of a rotary shaft, and the permeated water suctioning line may be connected to be rotated through driving of a motor.

A sealing flange may be installed at an upper end portion of the water tank through which the permeated water suctioning line and the air supply line pass A connecting portion between the upper permeated water line and the permeated water suctioning line, a connecting portion between the upper air line and the air supplying line, and a connecting portion between the permeated water suctioning line and the rotary shaft may be separably coupled to each other through connecting flanges.

A connecting portion between the rotary shaft and the porous support plate may be connected in a screw-coupling manner using a screw so that a position of the porous support plate can be varied upward and downward.

A lower end portion of the rotary shaft may be rotatably supported by a rotary shaft supporting member fixed to a bottom surface of the water tank, and a stopper for regulating rotation of the porous support plate may be installed at one side of the interior of the water tank.

A hatch door opened and closed to receive and withdraw the submerged membranes may be installed on one side surface of the water tank.

A lead shield body for shielding radioactive rays may be further installed on one side surface of the water tank where the hatch door is installed.

According to the waste liquid treatment apparatus of the present invention, since submerged membranes installed within a solid/liquid separator can be easily exchanged while being rotated by annularly disposing the submerged membranes and the number of the submerged membranes installed within the solid/liquid separator can be increased, making it possible to enhance a treatment capacity of a radwaste liquid.

Also, according to the present invention, since submerged membranes can be attached and detached one by one on a outer side surface of a water tank while annular permeated water suctioning pipes and annular air supplying pipes connected to the submerged membranes are rotating by installing a hatch door on one side surface of the water tank and providing a lead shield body for shielding radioactive rays, a convenience for exchange of the submerged membranes can be enhanced and radiation exposure of an operator can be reduced.

Furthermore, according to the present invention, submerged membranes of various heights can be installed due to a porous support plate whose height can be adjusted when the submerged membranes are fixed, and the submerged membranes can be promptly attached and detached by applying a one-touch connection method.

In addition, the present invention can be commonly applied to apparatuses for treating harmful/toxic materials as well as a radwaste liquid.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF EMBODIMENTS OF THE PRESENT INVENTION

Hereinafter, a configuration and an operation of a waste liquid treatment apparatus according to an exemplary embodiment of the present invention will be described in detail with reference to the accompanying drawings.

Figure 1:
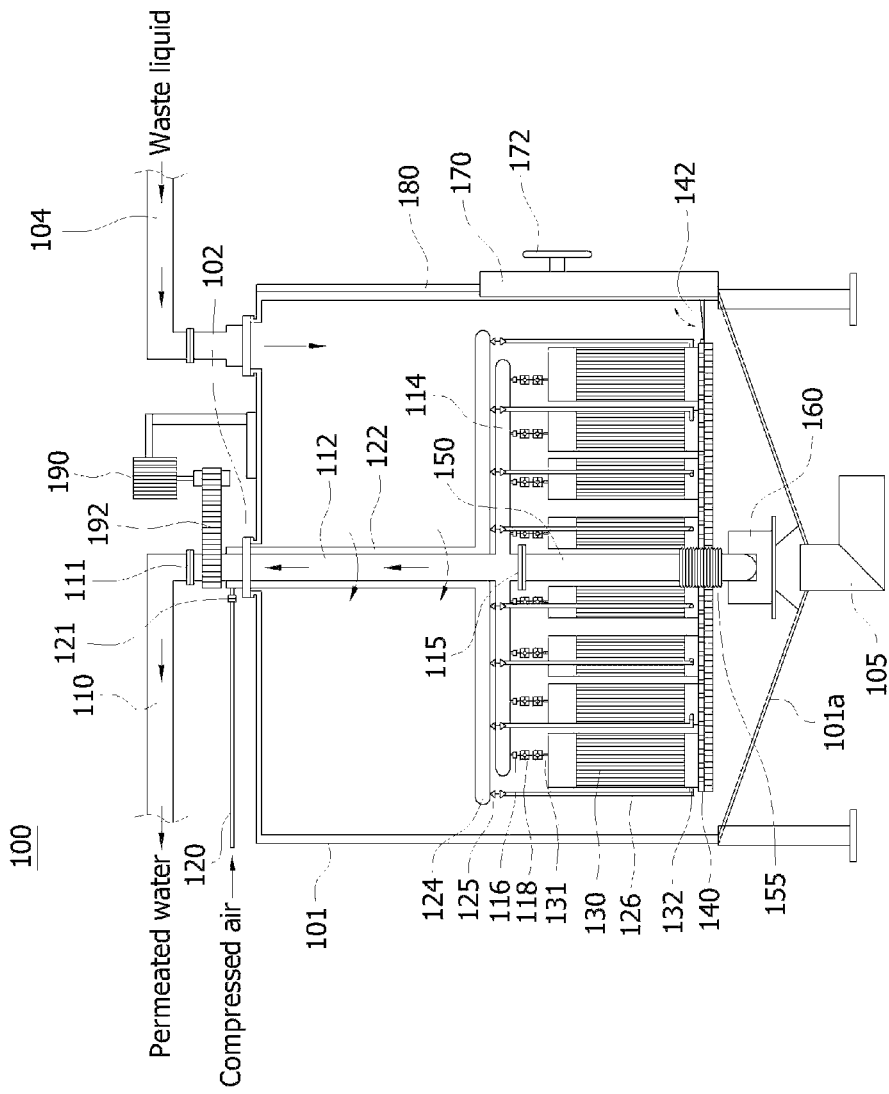
FIG. 1 is a side view of a waste liquid treatment apparatus where submerged membranes are annularly disposed according to the present invention.
Figure 2:
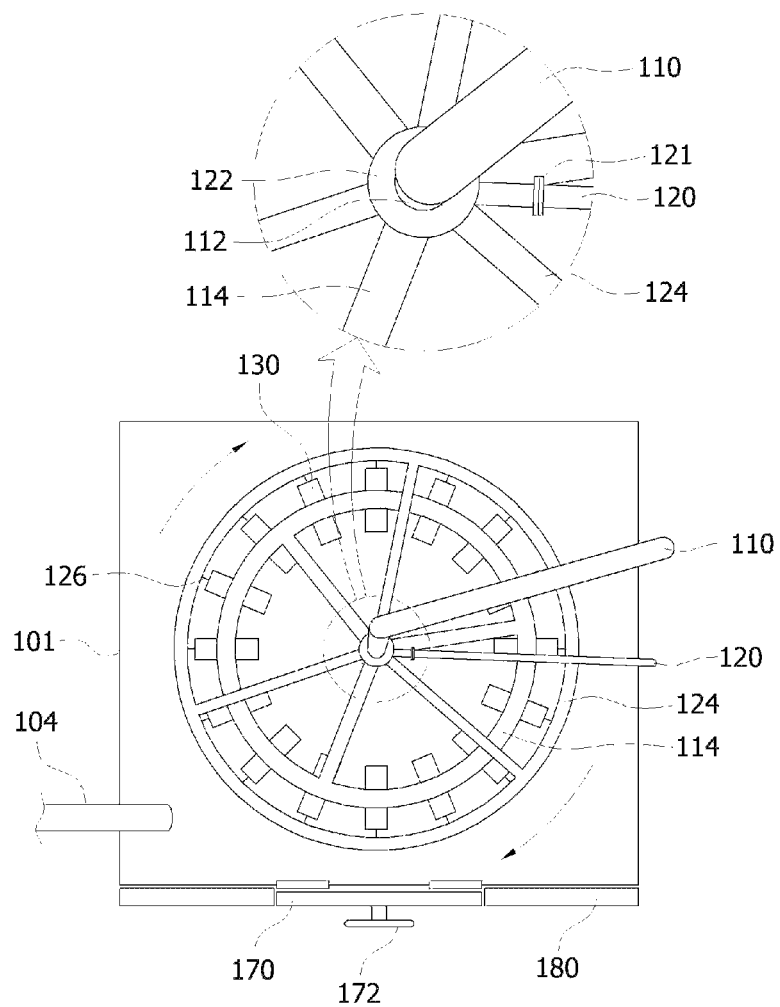
FIG. 2 is a top view of the waste liquid treatment apparatus where the submerged membranes are annularly disposed according to the present invention.

FIG. 1 is a side view of a waste liquid treatment apparatus where submerged membranes are annularly disposed according to the present invention. FIG. 2 is a top view of the waste liquid treatment apparatus where the submerged membranes are annularly disposed according to the present invention.

The waste treatment apparatus of the present invention enhances a waste liquid treating capacity in a solid/liquid separator 100, improves convenience of exchanging submerged membranes 130, and improves a method of connecting and fixing the submerged membranes 130.

In order to accomplish the above-mentioned objects, the solid/liquid separator 100 of the waste liquid treatment apparatus generally includes a water tank 101 into which waste liquid is introduced so that permeated water can be discharged and at a lower end of which foreign substances in condensed waste liquid are discharged through a water discharge line, a waste liquid introduction section 104 through which waste liquid is introduced into the water tank 101, a plurality of submerged membranes 130 annularly disposed within the water tank 101 and spaced apart from each other to filter foreign substances contained in waste liquid, a permeated water suctioning section for suctioning the permeated, water in the waste liquid which has passed through the submerged membranes 130 and supplying the suctioned permeated water to the outside, an air supplying section for supplying compressed air to prevent a filter plugging phenomenon generated when foreign substances are stuck to surfaces of the submerged membranes 130, and a porous support plate 140 for supporting lower portions of the submerged membranes 130 and attaching and fixing the submerged membranes 130 upward, the porous support plate 140 having a plurality of pores.

As a configuration for annularly disposing the submerged membranes 130 within the water tank 101 of the solid/liquid separator 100 according to the present invention, the permeated water suctioning section includes an upper permeated water line 100 extending from the outside of the water tank 101 to an upper side of the water tank 101, a permeated water suctioning line 112 connected to the permeated water line 100 and extending into the water tank 101, and a plurality of annular permeated water suctioning pipes 114 radially extending from a lower end of the permeated water suctioning line 112 and annularly disposed above the submerged membranes 130.

As the annular permeated water suctioning pipes 114 connecting the submerged membranes 130 are disposed circumferentially, the length of the annular permeated water suctioning pipes 114 becomes longer by the circle ratio than a conventional structure where permeated water suctioning pipes are linearly disposed within the same space as that of the water tank, increasing the number of installed submerged membranes 130 by approximately three times.

The air supplying section includes an upper air line 120 for supplying compressed air from the outside of the water tank 101 to an upper side of the water tank 101, an air supplying line 122 connected to the upper air line 120 and disposed to surround an outer peripheral surface of the permeated water suctioning line 122, and a plurality of air supplying pipes 124 radially extending from a lower end of the air supplying line 122 and annularly disposed above the submerged membranes 130.

Since the permeated water suctioning line 112 and the air supplying line 122 provided on an outer peripheral surface on the permeated water suctioning line 112 constitutes a dual pipe in the form of an air jacket, the permeated water suctioning line 112 and the air supplying line 122 can be integrally rotated together through driving of a motor 190 as will be described below, making it possible to easily exchange the submerged membranes 130.

A plurality of membrane connecting sockets 116 corresponding to the number of the annularly disposed submerged membranes 130 are installed on bottom surfaces of the annular permeated water suctioning pipes 114, and are connected to suction nozzles 131 installed at upper ends of the submerged membranes 130 by means of quick couplings. Thus, the submerged membranes 130 can be easily separated from the annular permeated water suctioning pipes 114 when the submerged membranes 130 are exchanged.

Air diffusers 126 connected to air inlet openings 132 installed below the plurality of submerged membranes 130 are connected to bottom surfaces of the annular air supplying pipes 124 by means of one-touch connectors. Thus, the air diffusers 126 can be easily separated from the annular air supplying pipes 124 when the submerged membranes 130 are exchanged.

Here, the quick couplings and the one-touch connectors facilitate coupling of the connecting portions of the apparatus, and may include various types of well-known one-touch connecting means.

Meanwhile, the permeated water suctioning line 112 and the porous support plate 140 are coupled to each other through a rotary shaft 150, and lower ends of the permeated water suctioning line 112 and an upper end of the rotary shaft 150 are separably coupled to each other using a connecting flange 115.

An upper end of the permeated water suctioning line 112 is connected to a rotary shaft of a motor 190 rotating at a low speed through a chain 191, and if the motor 190 is driven when the submerged membranes 130 are exchanged, the permeated water suctioning line 112 and the air supplying line 122 provided on an outer peripheral surface of the permeated water suctioning line 112 are integrally rotated and the rotary shaft 150, the porous support plate 140, and the submerged membranes 130 positioned on a top surface of the porous support plate 140 are rotated together in conjunction with the permeated water suctioning line 112 and the air supplying line 122.

Here, as the upper permeated water line 100 and the permeated water suctioning line 112 are separably coupled to each other by means of the connecting flange 111 and the upper air line 120 and the air supplying line 122 are separably coupled to each other by means of the connecting flange 121, they can be separated by releasing the connecting flanges 111 and 121 so that rotation interferences due to the upper permeated water line 110 and the upper air line 120 can be avoided when the motor 190 is driven at a low speed to allow exchange of the submerged membranes 130.

A sealing flange 102 for sealing a through-hole is installed at an upper end portion of the water tank 101 through which the permeated water suctioning line 112 and the air supply line 122 pass so that aeration through the air diffusers 126 and leakage of a radioactive gas in the water tank 101 to the outside of the water tank 101 can be prevented during treatment of radwastes.

Meanwhile, a lower end portion of the rotary shaft 150 passes through the porous support plate 140, in which case, since a screw 155 is formed on an outer peripheral surface of a lower portion of the rotary shaft 150 and a screw thread corresponding to the screw 155 is formed on an inner surface of the porous support plate 140 into which the screw 155 is inserted, a position of the porous support plate 140 can be varied upward and downward along the screw thread of the screw 155 during rotation thereof.

A lower end portion of the rotary shaft 150 is rotatably supported by a rotary shaft supporting member 160 fixed to a bottom surface 101a of the water tank 101.

In this way, a manipulation space of a connector for coupling the quick coupling 118 and the one-touch connector 125 can be provided when the submerged membranes 130 are attached or detached by rotating the porous support plate 140 to adjust a vertical position of the porous support plate 140, and action to variation in manufacturing standard (height) of the submerged membranes 130 become possible, making it possible to install submerged membranes 130 of various heights.

A stopper 142 for regulating rotation of the porous support plate 140 is installed at one side of the interior of the water tank 101. According to the embodiment of the present invention, the stopper 142 is configured to be pivoted at one side of the interior of the water tank 101 to be fixed to a side surface of the porous support plate 140.

Figure 3:
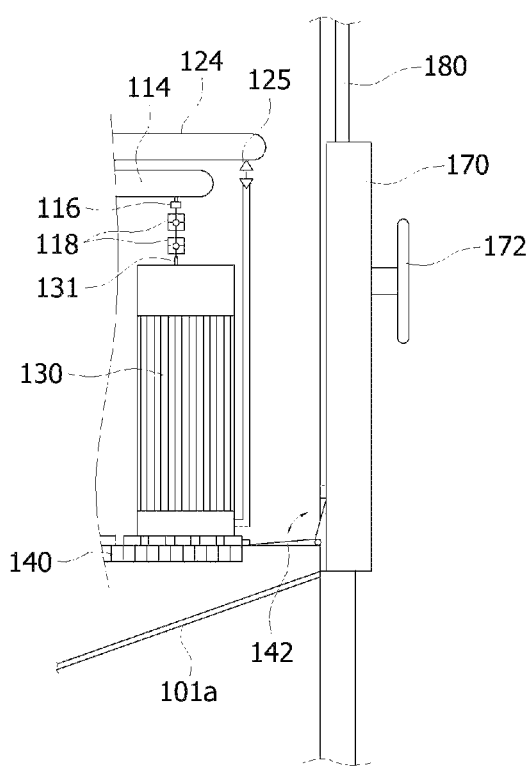
FIG. 3 is a detailed view of a side hatch door of the waste liquid treatment apparatus where the submerged membranes are annularly disposed according to the present invention.
Figure 4:
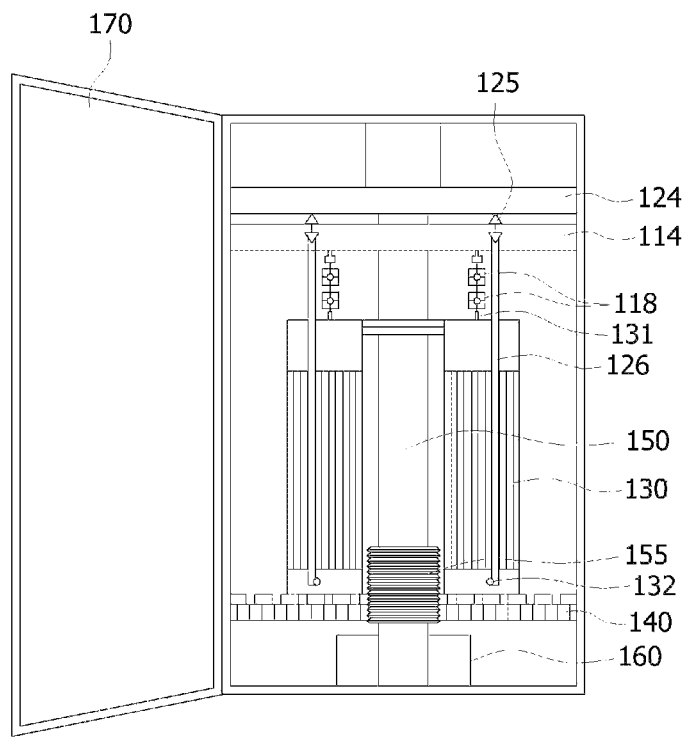
FIG. 4 is a view illustrating an opened state of the side hatch door of the waste liquid treatment apparatus where the submerged membranes are annularly disposed according to the present invention.

FIG. 3 is a detailed view of a hatch door of the waste liquid treatment apparatus where the submerged membranes are annularly disposed according to the present invention. FIG. 4 is a state view illustrating an opened state of the side hatch door of the waste liquid treatment apparatus where the submerged membranes are annularly disposed according to the present invention.

According to the present invention, a hatch door 170, which can be opened or closed to receive or withdraw the submerged membranes 130, is installed on one side surface of the water tank 101 to allow an operator to promptly attach or detach the submerged membranes 130 one by one to and from an outer surface of the water tank 101 when the submerged membranes 130 are exchanged.

The hatch door 170 is opened and closed to be pivoted to one side during rotation of a handle 172, and a sealing unit for preventing leakage of water is preferably installed at a peripheral portion of the hatch door 170.

A lead shield body 180 for shielding radioactive rays is additionally installed on one side surface of the water tank 101 where the hatch door 170 is installed to minimize radiation exposure to an operator.

Thus, during exchange of the submerged membranes 130, an operator opens the hatch door 170 and separates the connecting flanges 111 and 121 above the water tank 101, and releases a caught state of the stopper 142 and separates the quick coupling 118 and the one-touch connector 125 while rotating the motor 190 at a low speed to withdraw the submerged membranes 130 to the outside through the hatch door 170 and easily exchange the submerged membranes 130 with new ones.

While it has been illustrated and described that the waste liquid treatment apparatus of the present invention is a solid/liquid separator 100 for treating a radwaste liquid, the waste liquid treatment apparatus of the present invention may be commonly applied to an apparatus for treating a harmful/toxic material as well as a radwaste liquid, and it will be understood by those skilled in the art that various changes in form and details may be made therein without departing from the spirit and scope of the invention as defined by the appended claims.

What is claimed is:

1. A waste liquid treatment apparatus comprising:
a water tank into which a waste liquid is introduced and from which filtered permeated water is discharged;
a waste liquid introduction section through which the waste liquid is introduced into the water tank;
a plurality of submerged membranes annularly disposed in the water tank, spaced apart from each other, and filtering foreign substances contained in the waste liquid introduced through the waste liquid introduction section;

a permeated water suctioning section suctioning permeated water of the waste liquid which has passed through the submerged membranes, and discharging the permeated water outside of the water tank, wherein the permeated water suctioning section comprises a permeated water suctioning line;

an air supplying section supplying compressed air to the submerged membranes to prevent the foreign substances from sticking to surfaces of the submerged membranes;

a porous support plate supporting lower ends of the submerged membranes, and having a plurality of pores on a surface of the porous support plate;

a rotary shaft coupled to the permeated water suctioning line and to the porous support plate within the water tank; and a coupling portion coupling the rotary shaft to the porous support plate and including engaged complementary screw threads on the rotary shaft and on the porous support plate so that, upon rotation of the rotary shaft, position of the porous support plate within the water tank is varied, relative to the permeated water suctioning line, upward and downward depending upon direction of rotation of the rotary shaft.

2. The waste liquid treatment apparatus as claimed in claim 1, wherein
the permeated water suctioning section includes an upper permeated water line extending from outside the water tank to an upper side of the water tank, and the permeated water suctioning line is connected to the upper permeated water line and extends into the water tank, and the permeated water suctioning section further includes a plurality of radial permeated water suctioning pipes radially extending from the permeated water suctioning line, and an annular permeated water suctioning pipe connected to the radial permeated suctioning pipes and disposed above the submerged membranes, and the air supplying section includes an upper air line for supplying compressed air from outside the water tank to an upper side of the water tank, an air supplying line connected to the upper air line and extending into the water tank and surrounding an outer peripheral surface of the permeated water suctioning line, and a plurality of radial air supplying pipes radially extending from the air supplying line and an annular air supplying pipe connected to the radial air supplying pipe and disposed above the submerged membranes.

3. The waste liquid treatment apparatus as claimed in claim 2, including a plurality of membrane connecting sockets, wherein each membrane connecting socket corresponding to a respective submerged membrane and is located on bottom surfaces of the annular permeated water suctioning pipe, suction nozzles located at upper ends of the submerged membranes, quick-disconnect couplings connecting the membrane connecting sockets to the suction nozzles, air diffusers connected to air inlet openings located below the submerged membranes, and one-touch connectors connecting the air diffusers to the annular air supplying pipe.

4. The waste liquid treatment apparatus as claimed in claim 1, comprising a motor, wherein the permeated water suctioning line and the rotary shaft are rotates by the motor.

5. The waste liquid treatment apparatus as claimed in claim 2, including a sealing flange located at an upper end portion of the water tank and through which the permeated water suctioning line and the air supplying line pass.

6. The waste liquid treatment apparatus as claimed in claim 4, including,
a first connecting portion connecting the upper permeated water line to the permeated water suctioning line,
a second connecting portion connecting the upper air line to the air supplying line, and
a third connecting portion connecting the permeated water suctioning line to the rotary shaft, wherein the first, second, and third connecting portions are respective connecting flanges.

7. The waste liquid treatment apparatus as claimed in claim 1, including
a rotary shaft supporting member rotatably supporting a lower end of the rotary shaft, wherein the rotary shaft supporting member is fixed to a bottom surface of the water tank, and
a stopper for regulating rotation of the porous support plate, wherein the stopper is located within and at one side of the water tank.

8. The waste liquid treatment apparatus as claimed in claim 1, including a hatch door, opened and closed to install and remove the submerged membranes, wherein the hatch door is located a side surface of the water tank.

9. The waste liquid treatment apparatus as claimed in claim 8, including a lead shield body shielding radioactive radiation, and located on the side surface of the water tank where the hatch door is located.

* * * * *